March 2, 1954 | H. A. ROBINSON | 2,671,168

AUTOMATICALLY TUNED RECEIVER

Filed July 14, 1948

5 Sheets-Sheet 1

INVENTOR
HARRIS A. ROBINSON
BY [signature]
ATTORNEY

March 2, 1954 H. A. ROBINSON 2,671,168

AUTOMATICALLY TUNED RECEIVER

Filed July 14, 1948

5 Sheets-Sheet 2

INVENTOR
HARRIS A. ROBINSON
BY Harry Tunick
ATTORNEY

March 2, 1954
H. A. ROBINSON
AUTOMATICALLY TUNED RECEIVER
2,671,168
Filed July 14, 1948
5 Sheets-Sheet 3

INVENTOR
HARRIS A. ROBINSON
BY Harry Tunick
ATTORNEY

INVENTOR
HARRIS A. ROBINSON
BY Harry Tonick
ATTORNEY

INVENTOR
HARRIS A. ROBINSON
BY Harry Tunick
ATTORNEY

Patented Mar. 2, 1954

2,671,168

UNITED STATES PATENT OFFICE 2,671,168

AUTOMATICALLY TUNED RECEIVER

Harris A. Robinson, Philadelphia, Pa., assignor to Radio Corporation of America, a corporation of Delaware Application July 14, 1948, Serial No. 38,655

8 Claims. (Cl. 250—20)

Figure 1:
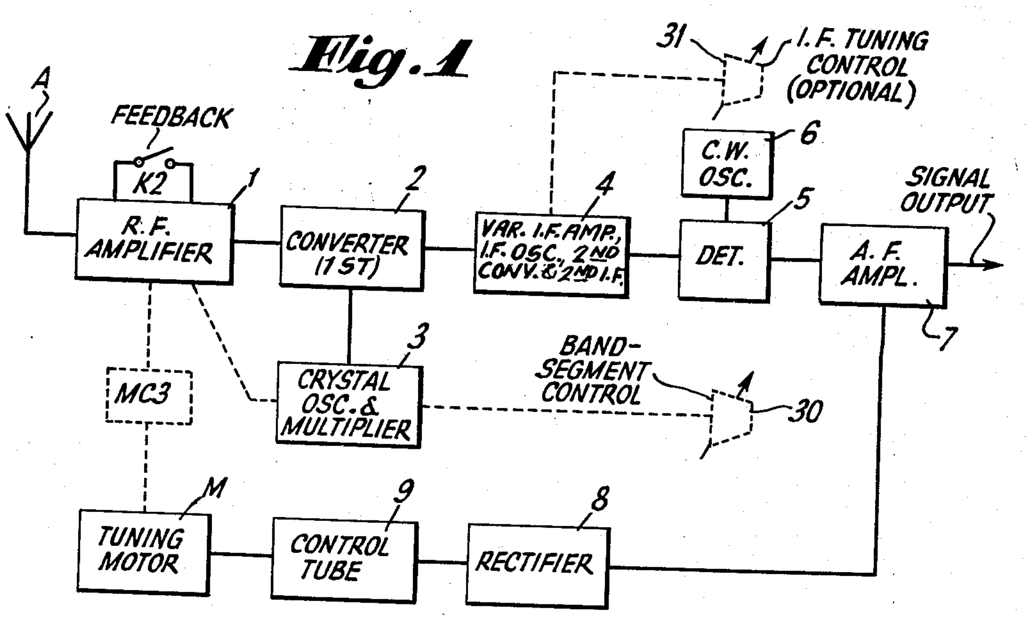

This application discloses new and improved apparatus for tuning radio receivers and transmitters of high stability.

The general object of my invention is to simplify the tuning procedure and reduce the number of tuning controls in a high stability radio receiver or radio receiver-transmitter equipment. The invention is applicable to receivers or transmitters arranged to operate at any selected channel in a band of frequencies and is of particular interest where stable operation of the receiver or transmitter over a wide range such as from 2 to 25 megacycles is desired, as in the systems disclosed in my U. S. Patent No. 2,419,593 and my U. S. application Serial No. 17,254, filed March 26, 1948, now Patent No. 2,654,832, dated October 6, 1953. This invention is particularly applicable to the types of transmitter-receiver systems shown in these references, where the desired signal frequency for reception and transmission is uniquely determined by the setting of a frequency band-segment switch and a limited range tuning control (such as the variable I. F. amplifier). After setting these frequency determining controls the automatic tuning of the R. F. circuits is accomplished by the following methods. In my U. S. application Serial No. 17,254 filed March 26, 1948, I provide means for tuning a receiver (or transmitter) to any selected frequency in a spectrum extending from 2 to 25 megacycles. For the sake of simplicity, reference will be made to the receiver only of said application. The receiver includes an R. F. amplifier stage, a crystal oscillator (with harmonic generators, if desired), the frequency of which is changed in one megacycle step, a first detector or converter, a variably tunable first I. F. and a tunable I. F. oscillator, a fixed tuned second I. F., C. W. beat oscillator, detector and audio amplifier. Since obviously, it is not feasible to have a crystal for every possible frequency it might be desired to use, the crystals of the crystal oscillator (or harmonics) are spaced in the spectrum (1 megacycle in the example given) and the first I. F. amplifier and I. F. oscillator are tunable through a range equivalent to the spacing between crystals or harmonics. Band-segment switches select the proper radio frequency band, and first oscillator crystal by means of a manual or motor driven band changing means. Then the I. F. tuning control is set manually to interpolate to the exact desired frequency within the segment corresponding to the selected fixed crystal or crystal harmonic. Since the radio frequency amplifier tuning is independent of these frequency determining controls, in general it will not be tuned to the selected frequency and it must be peaked or accurately tuned. In systems such as disclosed in the above said application, this peaking is done manually, requiring an additional tuning adjustment. In my improved system of the present invention, I provide means for automatically peaking the radio stages when the band switching, crystal selecting and I. F. amplifier tuning operation has been completed. I do this by providing a feed back connection in the R. F. amplifier stages which is effected when the crystal selection, band switching and I. F. amplifier tuning operations are completed. This provides a local signal source at the resonant frequency of the R. F. amplifier. A motor drive is conditioned to sweep the R. F. amplifier tuning through the previously selected band. When the R. F. tuning is correct, the generated oscillations pass through the radio frequency stages, mix with the selected crystal or its multiple frequency and produce an I. F. signal. The signal passing at the resonance setting of the variable first I. F. is converted to the fixed second I. F. and mixed with oscillations from the C. W. beat oscillator to produce audio output which operates through a control tube to render the motor ineffective to further tune the radio frequency stages. In a modification of my invention a separate oscillator gang tuned with the R. F. stages is provided and in similar manner swept through the frequency range for tuning purposes.

The precision of the automatic tuning operation of the present invention depends upon the accuracy with which the apparatus driving the tuning capacitor or equivalent element sweeping the frequency of the regenerative R. F. stage (or oscillator) through the band is controlled and stopped when the tuning is such as to pass energy through to the detector-output system. A further purpose of my invention is to provide an improved arrangement for controlling this tuning element drive.

In order to shorten the tuning period as much as possible, the tuning element used to sweep the frequency of the R. F. stage through its band is driven relatively fast and it may overshoot the resonant point slightly. A further object of my invention is to provide means for reversing the tuning drive in the event it overshoots. To prevent "hunting" in this tuning drive mechanism, I also provide means for slowing down the tuning drive apparatus when the direction of drive is reversed if overshooting occurs.

It will be noted that my tuning system makes use of the considerable selectivity inherent in a receiver of the superheterodyne type and for that reason, more precise tuning is attained.

My invention is applicable to receiver systems such as, for example, disclosed in my Patent No. 2,419,593, wherein one frequency reducing step only is used and the I. F. stages and C. W. oscillator are variably tuned. It will be understood that it is equally applicable to super-heterodyne receivers having variable or fixed I. F. stages or both. This invention is particularly applicable to the several types of transmitter-receiver systems where the desired signal frequency for reception and transmission is uniquely determined by the setting of a frequency band-segment switch and a limited range interpolation tuning control (such as the variable I. F. amplifier or equivalent). The invention is most frequently required in applications involving remote selection of frequencies and automatic tuning to same. In the detailed description which follows, a double super heterodyne receiver having a variable I. F. amplifier and I. F. oscillator, followed by a second converter, second fixed I. F. amplifier and detector, the latter supplied by oscillations from a C. W. beat oscillator, will be described.

An outstanding advantage of my system is that it does not require reception of a radio signal or radiation of transmitter output, to carry out the tuning operation since the required tuning signal is generated in the regenerative R. F. stage (or auxiliary oscillator). A further advantage of my system resides in the use of the selectivity of the entire receiver system to provide the potential, operating through the control tube, to stop the R. F. tuning operation at the correct point.

In an embodiment, a control potential is also derived by diverting output from the fixed tuned I. F. stages and feeding the same through a frequency discriminator to the control tube. It then might be said that a rough control is carried out by the potential from the audio stages and a fine control provided by the rectified output of the frequency discriminator.

Figure 6:
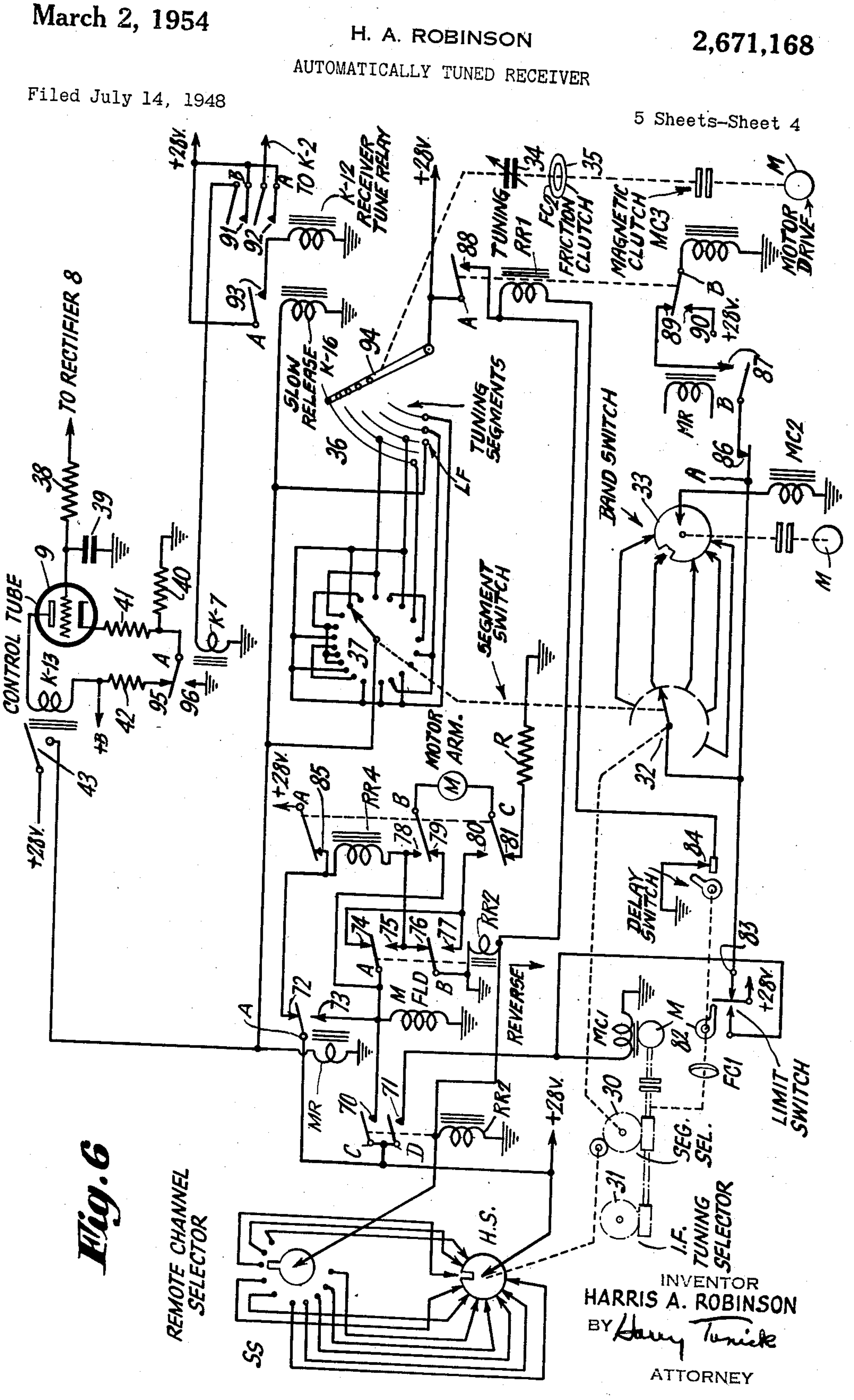

As an additional feature a speed reducing means is included in the drive when the reversal of direction of tuning resulting from overshooting takes place. This is shown in Figure 6 and comprises a series resistor R which is switched into the motor armature circuit upon reversal. An alternate arrangement employs a speed reduction drive coupled by a magnetic clutch which is energized at reversal by relay RR4 of Figure 6.

In describing my invention in detail, reference will be made to the attached drawings wherein Figure 1 illustrates diagrammatically and primarily by rectangle, a receiver of the double superheterodyne type with automatic tuning means including means for causing the R. F. stages to oscillate and means for sweeping the tuning of the stages through a proper tuning band and stopping said sweep when resonance is reached so that a signal passes through the heterodyne receiver.

Figure 2:
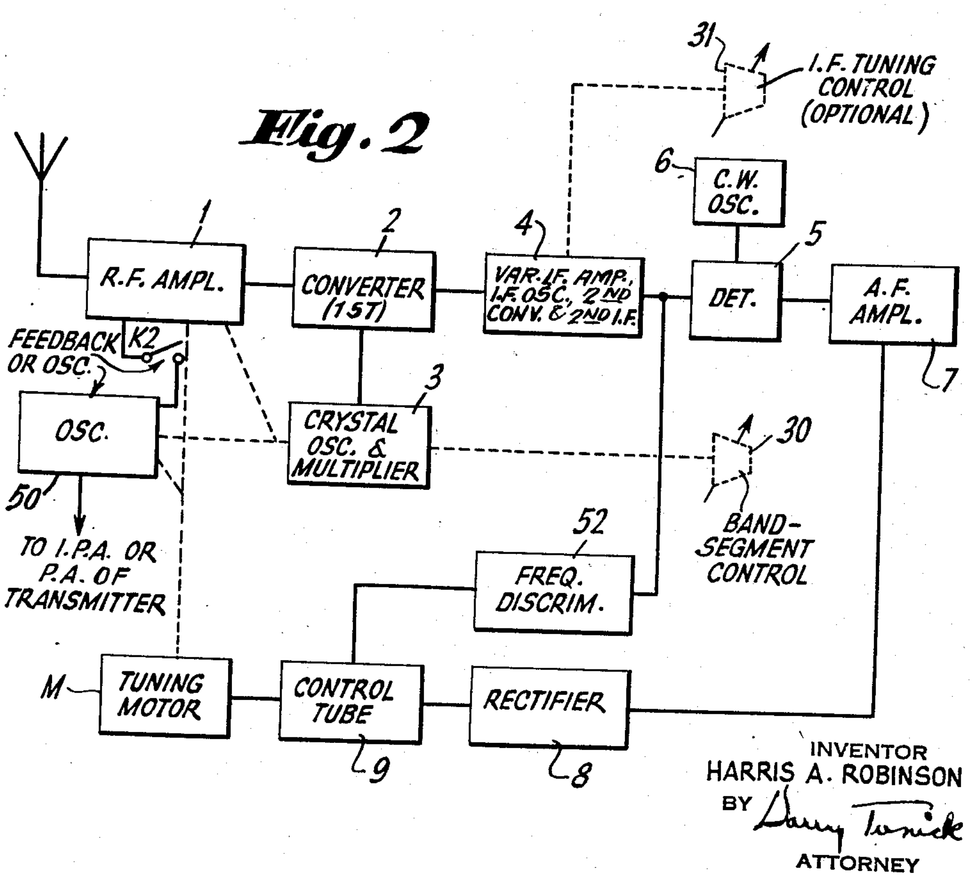

Figure 2 is a modification of Figure 1. In Figure 2 a separate oscillator is used to replace the regenerative R. F. stage of Figure 1. In this embodiment, a supplemental control for the drive of the tuning element, in the form of a frequency discriminator and detector which supplies a differential control potential, is also shown.

Figure 3:
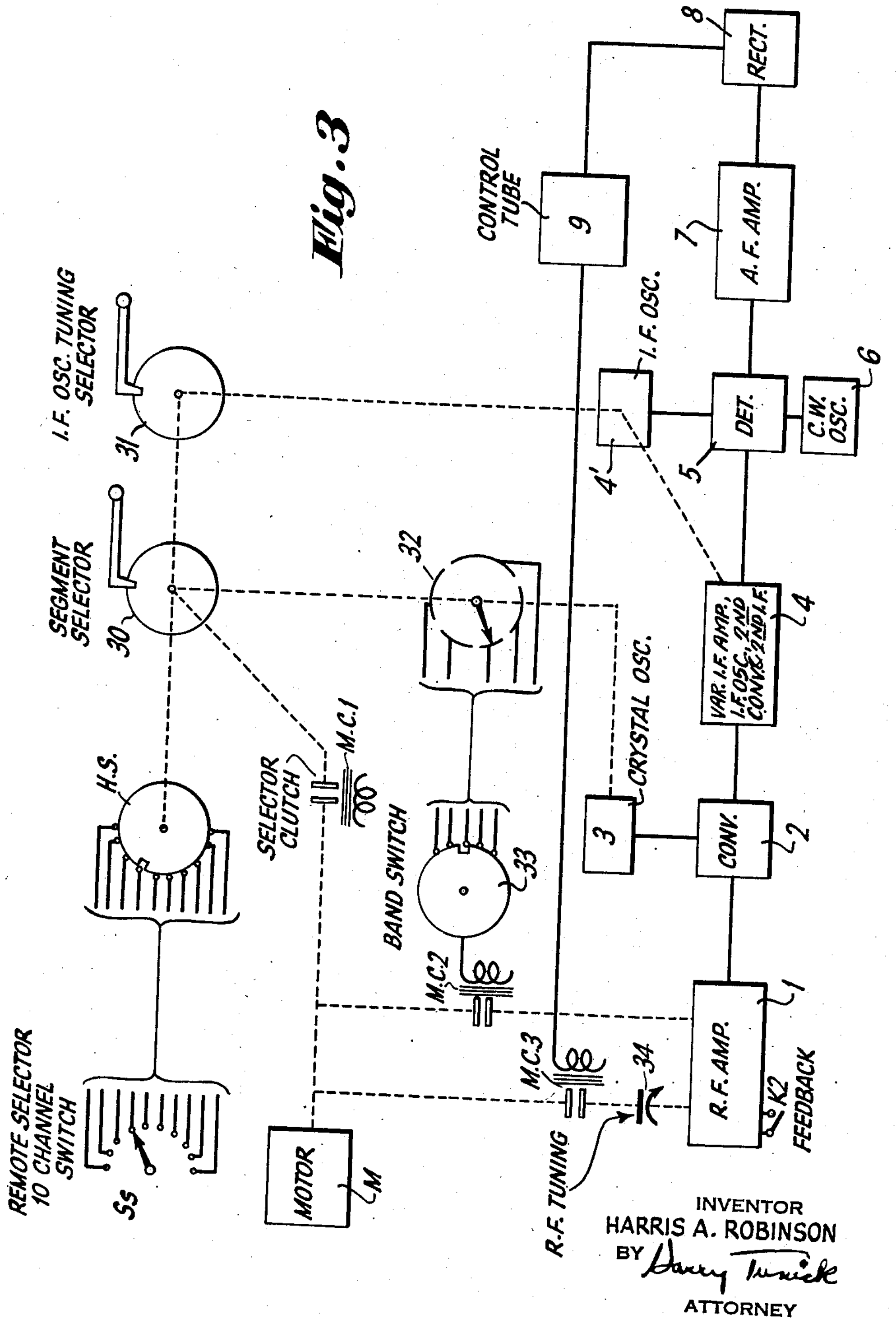

Figure 3 illustrates by block diagram the basic elements of an automatic tuner for the R. F. amplifier arranged in accordance with my invention and applied to a typical receiver of the super-heterodyne type which also incorporates the remote setting of the two frequency determining controls (segment switch and I. F. tuning) by ten position mechanical selector units (known to the art as "Autotune" units).

Figure 4:
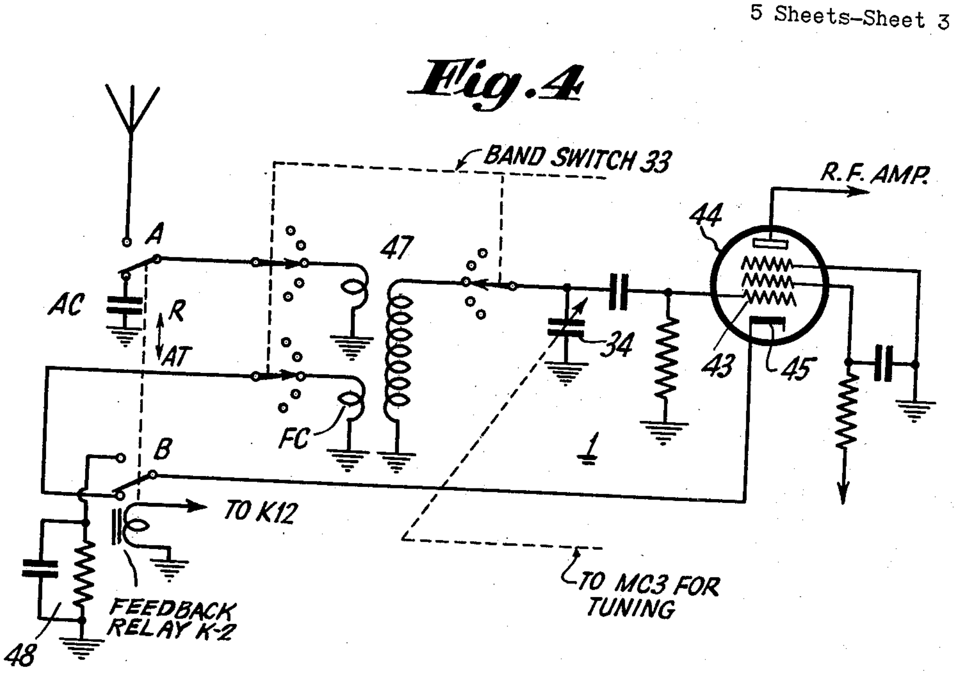
Figure 5:
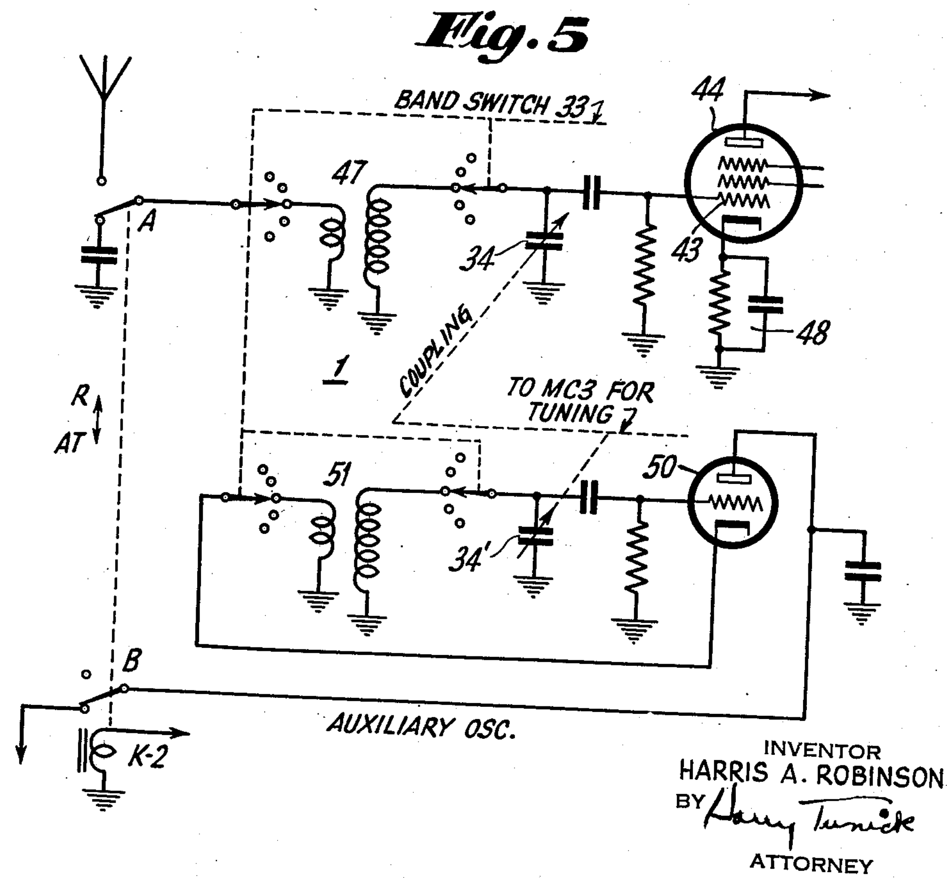

Figures 4 and 5 illustrate respectively the basic circuit connections of an R. F. stage and means for making it regenerative as in Figures 1 and 3 and a separate oscillation generator to be used in place of the regenerative R. F. stage as in Figure 2.

Figure 7:
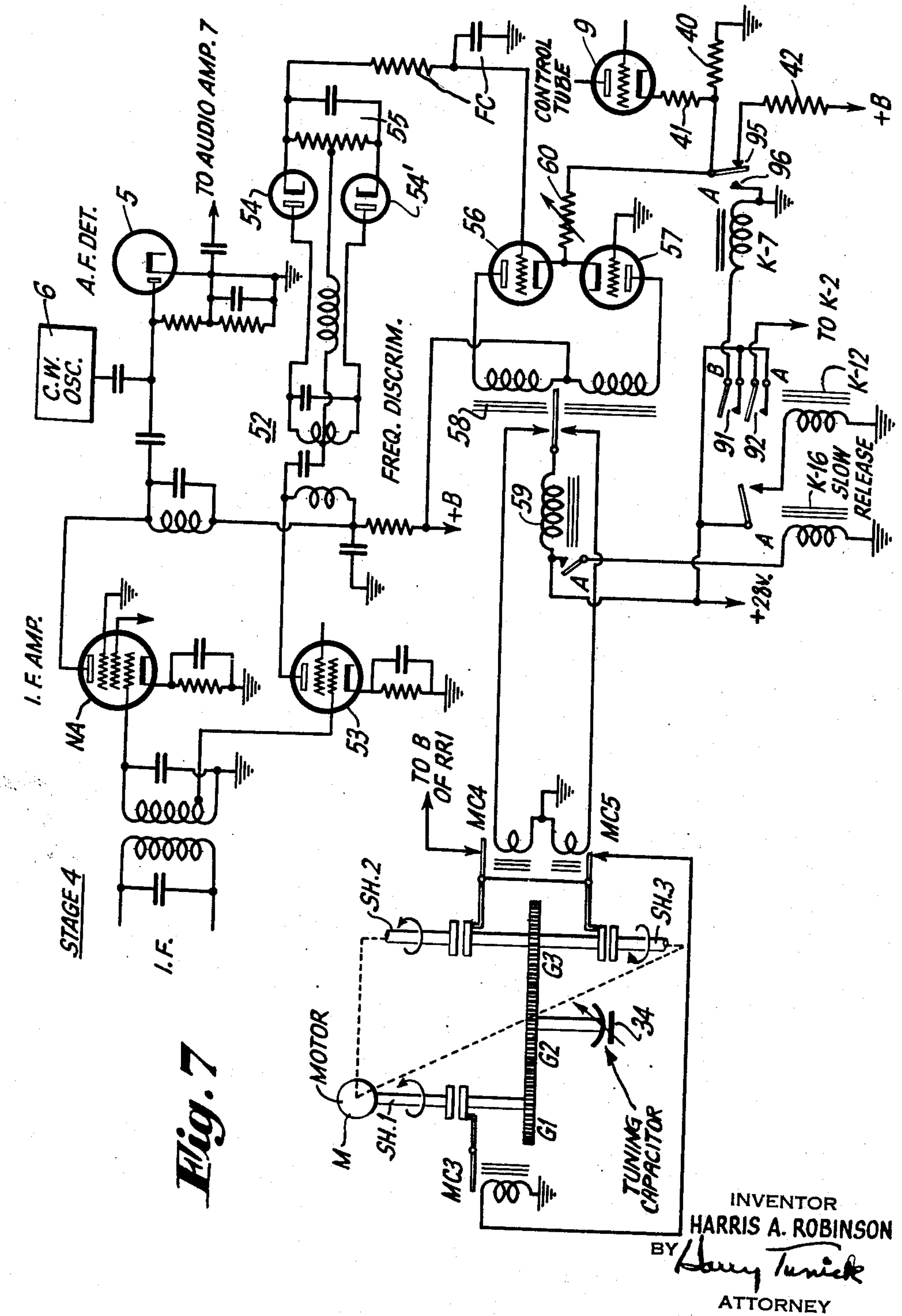

Figure 6 illustrates schematically details of the automatic tuning apparatus including the means for sweeping the R. F. amplifier stages (or the auxiliary oscillator ganged thereto) through a selected frequency band; and Figure 7 illustrates schematic details of the additional frequency discriminator control means for the tuning motor as shown previously in Figure 2.

In all these drawings the same symbol references are employed for similar elements. The antenna A connects to the radio frequency amplifier stage 1 which is coupled to the first converter 2. Unit 3 is the crystal oscillator coupled to the converter 2 and this oscillator has a plurality of crystals (not shown) which may be switched into the oscillator circuit by segment switch 30. This stage may include harmonic generators so that the frequency range may be extended or the number of crystals reduced. In this typical application it has been assumed that the frequency of the crystal oscillator is changeable in one megacycle steps in the band from 2 to 25 megacycles. 4 includes the variable tuned I. F. amplifier and/or the fixed tuned second I. F. amplifier coupled to the detector 5. 6 is the continuous wave beat oscillator also connected to the detector. 7 is the audio amplifier coupled to the detector 5. This A. F. amplifier supplies signal output, when the R. F. amplifier is correctly tuned, to the rectifier 8 which develops the control potential for control tube 9. The tube 9 operates to stop the tuning or peaking operation by the motor M in the radio frequency amplifier stages in 1 when they are correctly tuned. This desired tuning is that radio frequency which when mixed with oscillations from source 3, as set up by band segment and crystal oscillator control 30, produces I. F. side band energy of the frequency to which the variable I. F. amplifier 4 is set by tuning control 31. It should be noted these two controls (30 and 31) are the basic frequency determining controls which are normally calibrated in frequency. Switch 30 sets the desired segment of the frequency range and the I. F. tuning control 31 determines the fine or exact frequency in this segment. In the typical arrangement described here, these two controls are positioned from a remote point to any one of ten settings which have been preset by the mechanical selector units, commonly known in the art as "Autotune" or selector units.

In operation, the band segment control 30 is set to select the desired crystal oscillator output from source 3. Band switching as desired takes place in unit 1 and the I. F. tuning control 31 is set to interpolate to the desired frequency between the fixed I. F. frequencies which would result from selection of adjacent crystals in unit 3. By means described hereinafter, the motor M is then employed to effect these adjustments as subsequently selected by the remote channel selector switch SS, by driving the mechanical selector units on controls 30 and 31. The motor M also operates to perform the band switching which may be required in the R. F. amplifier 1 as determined by the setting of the band-segment switch 30. During the selector cycling time the motor M also drives the tuning element 34 to its lowest frequency reference setting. Relay K2 is energized to establish regenerative feed back in one of the radio frequency amplifier stages. The system then is in the "tune" position and the radio frequency amplifier functions as an oscillator supplying the local signal for tuning purposes. The tuning motor, through clutch MC-3, then sweeps the R. F. tuning element 34 over the frequency band until the output of the oscillating R. F. amplifier, at the desired signal frequency, combines with the crystal output in the first converter to provide a side band which passes through the I. F. amplifier and beating with the C. W. oscillator produces an audio output which when rectified and applied through the control tube 9, stops the tuning motor, by means of a fast acting magnetic clutch and brake or equivalent represented at MC-3. Various control tube arrangements may be used here. In Figure 6 I have shown an embodiment used. The control tube 9 has cathode resistors 40 and 41 and also 42 when the relay K7 is de-energized. The grid is supplied with rectified A. F. over resistor 38 and capacitor 39 and has a relay K13 in its anode circuit. Its details and operation will be described later. The R. F. amplifier, now returned to normal (feed back circuit open) is thus correctly tuned for the desired signal frequency corresponding to the particular settings of the band segment and I. F. tuning controls (30 and 31 respectively).

It will be understood that for certain applications the I. F. may be fixed as in conventional superheterodyne receivers. Then all that is required is selection of the band and segment by control 30, so that the proper crystal frequency is selected at 2 and the proper band is selected at unit 1. Then the relay K2 is energized and the tuning of the regenerative R. F. amplifier is swept through its range as described above.

When a remote ten channel mechanical selector system is employed for setting the frequency determining controls 30 and 31, the arrangement is as shown more specifically in Figures 3 and 6 wherein reference numerals and symbols corresponding to those used in Figure 1 are used insofar as possible.

The selection of a new frequency will be described in detail with reference to Figures 3 and 6. The remote channel selector switch SS is turned to a new position, thus initiating the cycling of the mechanical selector units which set the I. F. tuning control 31 and the segment selector control 30. With reference to Figure 6, turning the remote switch SS completes the circuit for the +28 volt supply through the homing switch HS to energize the reversing relays RR1 and RR2. (For wiring simplicity relay RR2 is shown as having two separate sections.) The homing switch (HS), delay switch and limit switch provide the automatic control for the mechanical selector units which set the I. F. tuning control 31 and the segment selector control 30. The mechanical selector units on controls 30 and 31 each include a respective drum which is driven by motor M. The homing switch HS is driven from the drum of the selector unit on control 30 and such switch rotates with the same speed as the drum from which it is driven. This drive of switch HS is illustrated in Fig. 6 by a dotted line connection from the drum of control 30 to switch HS. The function of homing switch HS is to operate the reversing relay RR2, which switches the connections to the armature of motor M. This reverses the direction of rotation of the drum of the selector unit on control 30 when such drum (and homing switch HS) reaches the angular position corresponding to the new position to which selector switch SS has been turned. However, to assure that the tuning to a new frequency is properly accomplished, the said drum must be prevented from reversing until it rotates at least 360°. This delaying is effected by the delay switch by releasing the holding relay RR1. It should be noted that the coil of RR1 returns to ground through the delay switch contact 84, which is normally closed at the beginning of a new tuning cycle. Contact B of RR2 opens the circuit at contact 76, thus releasing relay RR4 and allowing the motor armature to connect to points 78 and 80 respectively. The 28 volt supply passing through contact C to point 70 of relay RR2 energizes the motor field and also by way of contact A to points 75 of relay RR2 and 78 of relay RR4, energizes the motor armature. The other terminal of the motor armature is connected to ground through contact 80 of relay RR4 and contact 77 to switch B of relay RR2. This completes energizing the motor for the initial reversing portion of the selector cycle.

Contact D of relay RR2 connects to point 71, and thus supplies the 28 volt energy to the magnetic clutch MC1 to close the same so that the selector units are driven for the clearing cycle. Contact A of relay RR1 closing to point 88 applies the 28 volts supply as holding current on the several reversing relays RR1 and RR2 until the operation of the delay switch, after the completion of the clearing cycle, opens the holding relay circuit at point 84 and removes the ground return from relay RR1. Contact B of relay RR1 closes to point 90 and thus applies 28 volts to the magnetic clutch MC3 winding to close this clutch. Through the latter and a suitable gear train, the motor drives the tuning element 34 and its associated contact arm 94 to the LF reference position during the clearing cycle of the selector units. As the clearing cycle starts, the limit switch closes the circuit at 82, thus holding +28 volts on the magnetic clutch MC1 during the entire cycling of the selector units. After a pre-determined number of revolutions of the selector units during the clearing cycle, the delay switch opens the ground return of relay RR1 at contact 84, thus removing the +28 volt supply through contact A and point 88 of relay RR1 and de-energizing the tuning drive clutch MC3 through contact B, the latter returning to contact 89. As the homing switch HS reaches the selected channel, the 28 volt connection through the homing switch to the channel selector switch SS, is broken, and this de-energizes the reversing relay RR2. Contacts A and B of relay RR2 when de-energized, complete the circuit to 74 and 76 respectively, thus effectively reversing the direction of current flow to the motor armature and reversing the direction of rotation of the motor.

During the clearing cycle the tuning element 34 and its contact arm 94, having been driven to the LF reference position, applies the 28 volt supply to the slow release relay K16, and the motor relay MR through closure on point 73. Contact A of MR continues to supply the 28 volts to the motor field and also to the motor armature via contacts A and B of RR2 in the de-energized position. Contact B of relay MR, which is shown separately from contact A thereof in order to simplify the wiring, then engages point 87. The motor continues driving the selector units 30 and 31 to their final settings, but now in the forward direction. The selector cycling is completed by the opening of the limit switch contact 82, which de-energizes selector drive clutch MC1. The limit switch now contacts 83, supplying 28 volts for the band switching operation. Depending upon the setting of the segment selector 30, the band switch 32 may supply 28 volts to the band switch driving clutch MC2 through switch 33; thus as the motor continues to rotate in the forward direction, the band switch is driven until the contact at 33 agrees with the setting of the band segment selector 30 and 32, at which time the magnetic clutch MC2 is de-energized, and the band switching cycle completed. De-energizing MC2 completes the circuit for the 28 volts supply through contact A to point 86 of MC2, and thus supplies the 28 volts to the tuning condenser drive clutch MC3 through closed contact 87 of motor relay MR and closed contact 89.

The continued rotation of the motor in the forward direction is insured by the control tube 9 being energized through relay K–7 which returns the cathode of the control tube to ground through contact A and point 96 of K7. Then the contact 43 of relay K13 is closed putting 28 volts on the motor relay MR. It should be noted that relay K7 is actuated by closure of contact B on point 91 of the receiver "Tune" relay K12. Relay K12 was energized by the closure of contact A on point 93 of the slow release relay K16, which was energized as noted previously. Contact A of K12 on point 92 applies 28 volts to the regenerative feed-back relay K2 (Figures 1, 2, 3, 4 and 5), and thus insures the generation of the local signal during the tuning cycle. Normally, no signal is present on the grid of the control tube to develop a negative bias thereon and hence the control tube relay K13 is energized, keeping the 28 volt supply applied to the motor relay MR and to the slow release relay K16 during the tuning cycle. As the motor drives the tuning element 34 through the frequency band, at the correct tuning point the locally generated signal at the frequency of the R. F. amplifier combines with the selected crystal output in the first converter, passes through the variable tuned I.-F. amplifier, and after detection at 5, amplification at 7 and rectification at 8, actuates the control tube 9. The appearance of the rectified signal biases the control tube grid in a negative direction, thus de-energizing K13. The motor relay MR is also de-energized and the contact A closing to point 72 applies 28 volts to relay RR4. The latter is energized and locks into a holding condition by means of contact A of RR4 closing to 85. Contacts B and C of RR4 again reverse the direction of current flow in the motor armature by closing to points 79 and 81, respectively. It should be noted that contact 81 completes the motor armature circuit to ground through the series resistance R, and it is the function of the latter to reduce the motor speed as the motor now is reversed and seeking again the proper tuning point. It should be noted that in general as the tuning is swept very rapidly through the band the rectified signal appears on the grid of the control tube 9 only momentarily. This momentary release of relay K13 and motor relay MR is sufficient to lock up the speed reducing, reversing relay RR4 as just described. However, the slow release relay K16 is unaffected and as the signal disappears from the grid of the control tube 9 by reason of this overshooting, relays K13 and MR return to their previously energized positions. Thus the motor remains energized though now driving in a reversed direction and at reduced speed as a result of the lock up of relay RR4. The tuning element 34 is thus slowly returned to the correct tuning point, at which time the signal reappears on the control tube grid. K13 and the motor relay MR are again de-energized. Contact B of MR opens the 28 volt supply lead to the magnetic clutch MC3 driving the tuning element and the continued persistance of the signal on the control tube grid keeps the 28 volt supply from the slow release relay K16 (K13 being open) until the latter opens. This de-energizing of K16 breaks the +28 volts to K12 and the latter breaks the +28 volts supply via contact B, de-energizing relay K7. Relay K7 in its de-energized position connects A to 95, applying a positive bias to the control tube cathod, thus effectively locking out K13 until the start of another tuning cycle. Contact A of K12 de-energizes the feed back relay K2, returning the equipment to the "Receive" condition.

The contact of the arm 94 on the tuning condenser shaft, with the segments of the tuning segment switch 36 insures that the tuning is not stopped at an image or similar spurious response, by connecting the +28 volt supply to the motor relay MR and relays K16, etc. These tuning segments 36 extend over different angular positions and are selected by the selector positioned segment switch 37, the proper angular segment having been connected to insure that the tuning cycle could not be interrupted by a spurious response signal while the tuning condenser was sweeping up to the vicinity of the correct frequency.

The essential details of the radio frequency stage 1 of Figures 1 and 3 are shown in Figure 4. These circuits include an R. F. amplifier tube 44 with band switching circuits 47 coupling the tube grid 43 to an antenna A when the winding of relay K2 is de-energized as described above. Then the cathode 45 is coupled to ground through resistor and capacitor unit 48. When the winding of relay K2 is energized the armature is pulled down in the position shown to couple the primary winding of transformer 47 to the capacitor AC. The capacitor AC replaces the antenna A. The cathode 45 is then connected to ground through feed back coil FC coupled to the windings of transformer 47 to set up regeneration. When the clutch MC3 is closed the tuning capacitor 34 is driven and the tuning operation described above is carried out. Only one transformer 47 is shown for the band switch 33. However in the normal equipment, similar coils are connected to each of the contacts for the separate bands of the band switch 33. The relay K2 is closed as described hereinbefore when contact 92 of relay K12 is closed to put +28 volts on the winding of relay K2.

During automatic tuning conditions AT, feedback relay K–2 is energized and contact A switches in an equivalent artificial antenna capacitor AC while contact B switches the cathode to the feedback winding on the input transformer 47, thus producing oscillation of the R.-F. amplifier at the normal frequency of tuning of the input circuits. When the peaking operation is complete as described above, relay K13 is deenergized, slow release relay K16 is deenergized and also relay K7 and contact A of relay K7 moves to point 95 to apply a blocking potential to the cathode of tube 9.

The embodiment of Figure 2 is about similar to the embodiment of Figure 1 except for the following differences which will now be explained. A separate oscillator is used instead of the feedback in the R. F. stages. This separate oscillator is ganged with the capacitor 34 tuning the R. F. stage as described above. Then the arrangement is as shown in Figure 5. In this alternate arrangement a separate auxiliary oscillator is employed with the ganged tuning condenser 34' tuning the oscillator grid circuit. The cathode of the oscillator tube 50 is coupled to the grid winding in the oscillator transformer 51. Again only the coils for a single position of the band switch are shown for clarity. These are normally duplicated for each position of the frequency band switch 33. The oscillator output is normally coupled into the R.-F. amplifier by the common coupling existant in the ganged tuning capacitor. However, additional coupling capacity may be employed in some applications. The relay K2 now functions to apply plate voltage to the anode of tube 50 when the winding of relay K2 is energized.

The embodiment of Figure 2 also differs in the manner of operating the control tube 9 when energy passes through the intermediate frequency stages. A more exact tuning apparatus and operation is carried out as illustrated in Figure 7. Referring to Figure 7 and Figure 2, the I. F. input is coupled by means of the IF transformer 4 to the normal I. F. amplifier NA which feeds the audio detector 5, to which is coupled the C. W. beat oscillator 6, as is common to the previously described arrangement of Figure 3. Transformer 4 also feeds the grid circuit of tube 53, which is coupled to the frequency discriminator 52 of the conventional Seeley type, tuned to the I. F. frequency. The diodes 54 and 54' produce a rectified D.-C. output dependent in polarity and amplitude upon the deviation of the input frequency from the exact tuning of the discriminator 52, and the D.-C. output is filtered by the resistor-capacitor components 55 and FC and applied to the auxiliary control tubes 56 and 57. In the plate circuits of the latter, a polarized or differential relay, 58, of the "Micropositioner" type, energizes the magnetic clutches MC4 or MC5 to give the forward or reverse drive of the tuning condenser 34 when positioning the latter for exact tuning. Relay 59 closes the circuit by means of contact A to the slow release relay K-16 whenever unbalance exists in the control tubes 56 and 57. The variable resistor 60 is employed for initially balancing these control tubes when no signal is present. This resistor is in the common cathode circuit of the control tubes and is returned to contact A of relay K7, the latter functioning to switch in the discriminator control functions during the automatic tuning cycle. The connections and functioning of relays K7, K12 ad K16 are identical to those previously described for Figure 6, as is also the function of the control tube 9.

The tuning condenser 34 is driven during the first portions of the tuning cycle in a manner similar to that previously described under Figure 6, through the functioning of magnetic clutch MC3 and the gear train G1, G2. The tuning motor also drives the auxiliary shafts SH2 and SH3 in opposite directions through appropriate gear trains. The electrical connection to clutch MC3 is interlocked through the contacts on the auxiliary clutches MC4 and MC5, so that when either of these auxiliary clutches is energized, the drive through MC3 is dis-engaged. In the diagram of Figure 7, these three clutches are shown in one embodiment as axially displaced, friction clutches; however, this type of clutch is merely for the purpose of illustration, and more efficient magnetic clutches may be employed.

The functioning of this more exact tuning arrangement as shown in Figures 2 and 7, can best be described by noting that the initial portions of the tuning cycle are completely identical to that previously described in detail with reference to Figures 3 and 6. However, as the signal approaches the exact frequency for correct tuning, it passes through the I. F. selective circuits, and the discriminator, and results in an unbalancing of the control tubes 56 and 57, depending on the relative frequency with respect to the normal discriminator cross over point. The unbalance of control tubes 56 and 57 actuates one or the other of the magnetic clutches MC4 or MC5. The mechanical arrangement as shown in Figure 7 is such that when either of these clutches is energized, the motor drive is uncoupled through the magnetic clutch MC3 and the final positioning of the tuning element 34 is accomplished from either direction, dependent upon the operation of the control tubes 56 and 57, and the corresponding magnetic clutches MC4 and MC5. The circuit closure through the unbalancing of differential relay 58 actuates the series relay 59, as well as one or the other of the auxiliary clutches MC4 or MC5. Thus, until the frequency is exactly positioned, the relay 59 will keep the slow release relay K16 energized, and the latter keeps the motor drive and the regenerative tuning oscillator in action until the exact tuning has been attained, and the control tubes 56 and 57 restored to a balanced condition. When the balance has been restored, the series relay 59 opens contact A, thus de-energizing relays K16, K12, etc., completing the tuning cycle.

In an alternate arrangement, which does not require a C. W. beat oscillator, the output of the I. F. amplifier 4 is connected directly to the rectifier 8 and control tube 9.

What is claimed is:

1. In apparatus for automatically tuning a tunable radio frequency stage feeding a frequency converter stage, a source of oscillations of fixed frequency coupled to the frequency converter stage, and side-band stages tuned to a known frequency coupled to said converter stage, means for setting up in said radio frequency stage oscillatory energy of variable frequency which corresponds to the frequency to which the radio frequency stage is tuned, means for varying the frequency of said oscillatory energy and correspondingly varying the tuning of said radio frequency stage, and automatically-operating means controlled by output from the side-band stage, said last-named means acting to inhibit operation of the frequency-varying means in response to the passage of sideband energy through said sideband stages.

2. In apparatus for automatically tuning a tunable radio frequency stage feeding a frequency converting stage followed by side-band stages, means setting up regenerative feedback in said radio frequency stage for generating oscillatory energy of variable frequency, means for feeding said energy to said converting stage, means for varying the tuning of said radio frequency stage to vary the frequency of said oscillatory energy, and means operated by output from said side-band stages, and responsive to the passage of side band energy therethrough, for inhibiting operation of said tuning means and for removing said regenerative feedback.

3. In an automatic tuner for the radio frequency stage of a superheterodyne receiver including a fixed frequency oscillator, a frequency converter, and an intermediate frequency stage tuned to a pre-set frequency, a variable reactor for tuning said radio frequency stage through a frequency range including the frequency which when mixed with oscillations from said oscillator in said converter provides side-band energy of the frequency to which said intermediate frequency stage is tuned, means for setting up oscillatory energy in said radio frequency stage of a frequency corresponding to the tuning of said radio frequency stage, a motor for varying the frequency of said oscillatory energy and correspondingly varying said reactor through its tuning range, and apparatus controlled by the output of said intermediate frequency stage, and responsive to the presence therein of side band energy of said pre-set frequency, for preventing said motor from varying the frequency of said oscillatory energy and varying said reactor.

4. In an automatic tuner for a radio frequency stage of a superheterodyne receiver including a pre-set oscillator, a frequency converter, and an intermediate frequency stage tuned to a pre-set frequency, a variable reactor for tuning said radio frequency stage through a frequency range including the frequency which when beat, in said converter, with oscillations from said oscillator provides side-band energy of the frequency to which said intermediate frequency stage is tuned, regenerative means for generating oscillatory energy in said radio frequency stage of a frequency determined by the adjustment of the variable reactor therein, a motor for driving said reactor through its tuning range, and apparatus controlled by the output of said receiver, and responsive to the presence therein of side band energy of the frequency to which said intermediate frequency stage is tuned, for preventing said motor from driving said reactor.

5. In an automatic tuner for a radio frequency stage of a superheterodyne receiver including a pre-set oscillator, a frequency converter, and intermediate frequency stages tuned to a pre-set frequency, a variable reactor for tuning said radio frequency stage through a frequency range including the frequency which when beat with oscillations from said oscillator in said converter provides side-band energy of the frequency to which said intermediate frequency stages are tuned, a separate oscillation generator with tuning means for setting up oscillatory energy in said radio frequency stage of a frequency determined by the adjustment of said generator, a motor for driving said reactor and the oscillation generator tuning means through a selected tuning range, and apparatus controlled by the output of said receiver, and responsive to the presence therein of side band energy of the frequency to which said intermediate frequency stages are tuned, for preventing said motor from driving said reactor and generator tuning means.

6. In apparatus to be used for tuning a multiple band tunable radio frequency stage which supplies energy to a tunable converter also supplied with energy from a multiple range pre-set crystal oscillator, in combination, automatic means for selecting the desired frequency band, for selecting the desired crystal oscillator range and for tuning said converter, tuning means also operating automatically to sweep said radio frequency stage tuning to one end of its range in response to the operation of said means for selecting, means for setting up in said radio frequency stage oscillatory energy of a frequency which corresponds to the frequency to which it is tuned, means for sweeping the tuning of said radio frequency stage through its tuning range and simultaneously changing the frequency of said oscillatory energy, and means controlled by energy appearing in the output of said last-mentioned converter for stopping said tuning and frequency changing operations.

7. In an automatic tuner for a tunable radio frequency stage of a superheterodyne receiver, having a local pre-set oscillator, a converter coupled to the local oscillator and radio frequency stage and having an intermediate frequency stage set at a pre-selected frequency, a variable reactor for tuning said radio frequency stage, means for setting up oscillatory energy in said radio frequency stage of a frequency corresponding to the tuning of such stage, means operable in part on said reactor for sweeping the stage tuning and oscillatory energy frequency through a range which includes the frequency which when beat with oscillations from said local oscillator supplies a side-band which passes through said intermediate frequency stage, and apparatus controlled by output from said intermediate frequency stage for stopping the operation of said last named means.

8. In an automatic tuner for a tunable radio frequency stage of a superheterodyne receiver, having a pre-set oscillator, a converter coupled to said oscillator and said stage, an intermediate frequency stage set at a preselected frequency and having an audio frequency detector with a beat oscillator coupled to the intermediate frequency stage, a variable reactor for tuning said radio frequency stage, means for setting up oscillatory energy in said radio frequency stage of a frequency corresponding to the tuning of such stage, means operable in part on said reactor for sweeping the stage tuning and oscillatory energy frequency through a frequency range including a frequency which operates through the converter to pass side band energy through the intermediate frequency stage and to supply output of considerable magnitude, and apparatus controlled by the output of said intermediate frequency stage and by the output of said detector for inhibiting the operation of said last-named means.

HARRIS A. ROBINSON.

References Cited in the file of this patent

UNITED STATES PATENTS

| Number | Name | Date |
|---|---|---|
| 2,171,139 | Cornelius | Aug. 29, 1939 |
| 2,174,566 | Case | Oct. 3, 1939 |
| 2,270,023 | Ramsay et al. | Jan. 13, 1942 |
| 2,316,899 | Stolzenberg | Apr. 20, 1943 |
| 2,320,808 | Lammeren et al. | June 1, 1943 |
| 2,326,737 | Andrews | Aug. 17, 1943 |
| 2,369,542 | Dietrich | Feb. 13, 1945 |
| 2,419,593 | Robinson | Apr. 29, 1947 |
| 2,496,832 | Wallace | Feb. 7, 1950 |
| 2,499,584 | Hills | Mar. 7, 1950 |
| 2,505,754 | Combs | May 2, 1950 |
| 2,605,401 | Andrews | July 29, 1952 |

FOREIGN PATENTS

| Number | Country | Date |
|---|---|---|
| 570,636 | Great Britain | July 16, 1945 |